May 26, 1959  C. S. ALLEN  2,888,128
POWER OPERATED FLEXIBLE CONVEYOR
Filed Dec. 16, 1955  2 Sheets-Sheet 1
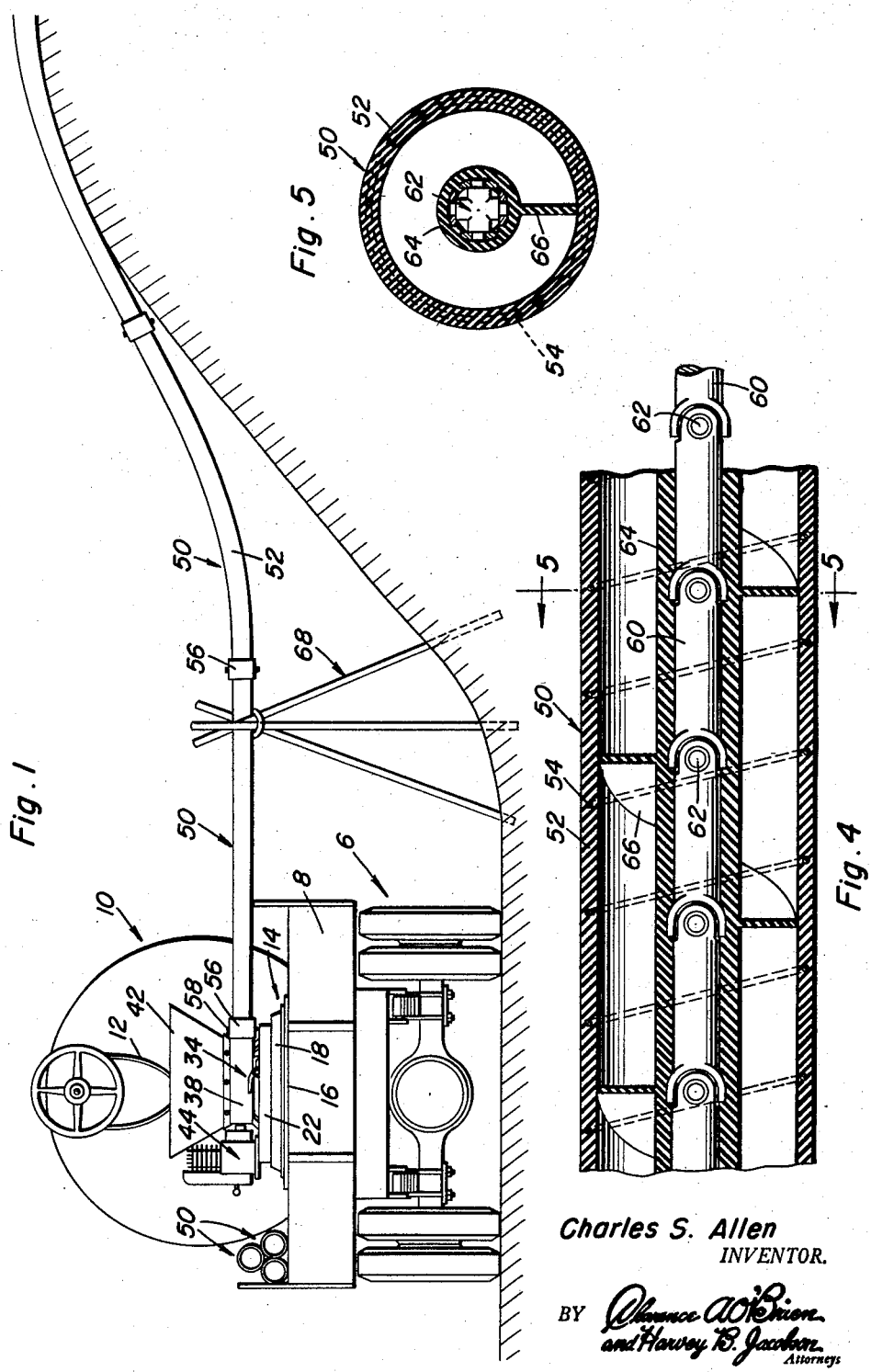
Charles S. Allen
INVENTOR.

May 26, 1959
C. S. ALLEN
2,888,128
POWER OPERATED FLEXIBLE CONVEYOR
Filed Dec. 16, 1955
2 Sheets-Sheet 2
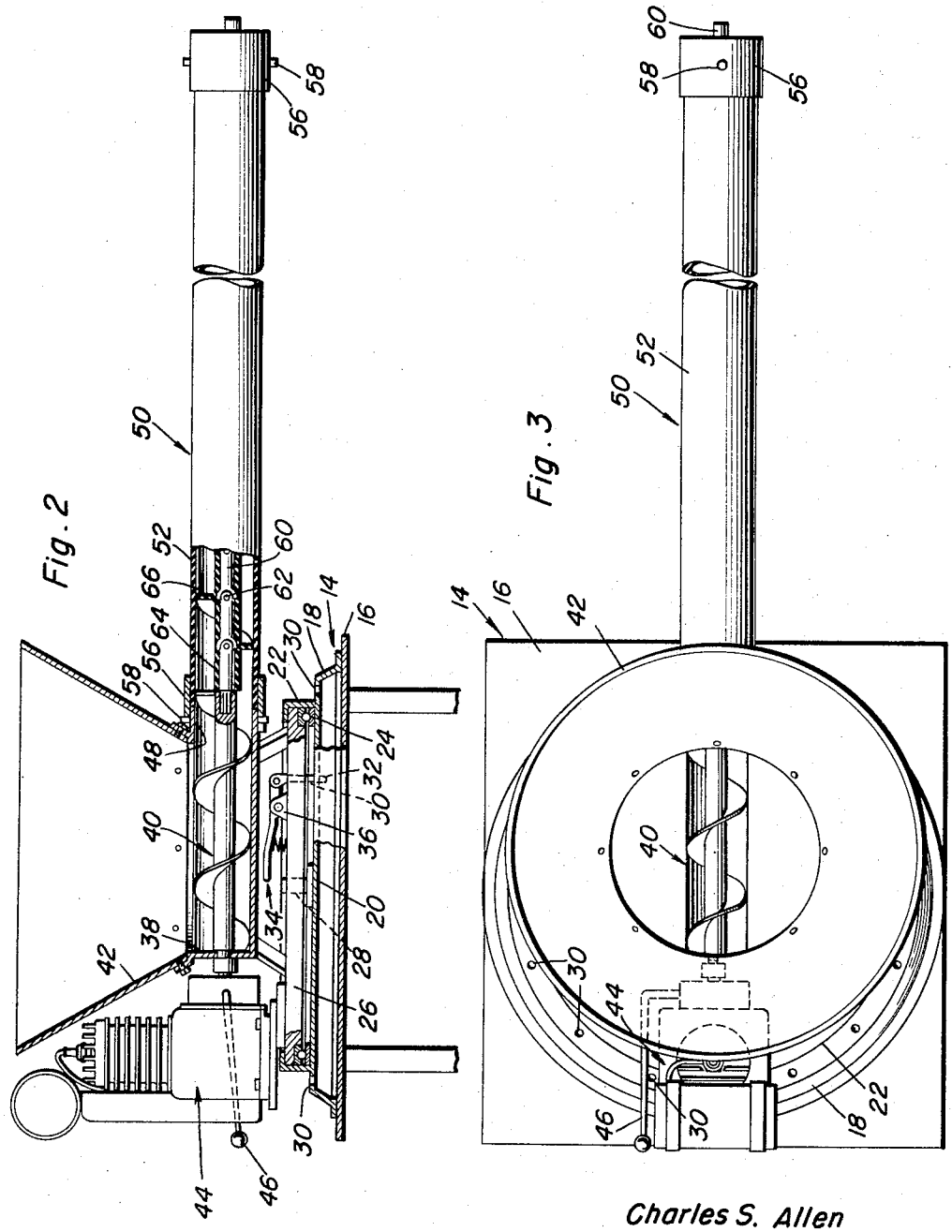
Charles S. Allen
INVENTOR.

United States Patent Office 2,888,128
Patented May 26, 1959

2,888,128

POWER OPERATED FLEXIBLE CONVEYOR

Charles S. Allen, Bakersfield, Calif.

Application December 16, 1955, Serial No. 553,509

3 Claims. (Cl. 198—64)

The present invention relates to a novel hopper and powered conveyor which is mounted on the rear end of the bed or platform of a mobile concrete mixing machine, the general object of the invention being to dispense with the practice of hauling mixed concrete in wheelbarrows and delivering it to the work place by way of an easy-to-handle flexible conveyor.

Stated otherwise, the objective in the instant matter is to effectually and satisfactorily conduct read-to-use concrete directly from a source of supply, the stated concrete mixing machine, to an intended place of deposit in a manner to save time and labor and to achieve this desirable end result where the terrain is hilly and irregular, while at the same time permitting the concrete mixing machine to remain on a nearby roadway or similar land surface where it may be driven and maneuvered.

Briefly summarized, the inventive concept is carried out through the medium of a conventional type mobile concrete mixing machine which is characterized, as usual, by a wheel supported bed or platform on which the mixing and emptying drum and attending structure are mounted and the combination therewith of a turntable mounted for hand regulated rotation and adjustment on said platform, a receiver fixed atop said turntable, a hopper mounted on and serving to funnel concrete from said spout into said receiver, a rigid screw conveyor mounted for operation in said receiver, the latter being closed at one end and open at the other end, a prime mover mounted on said turntable for movement simultaneously therewith and having operating connection with said screw conveyor, an elongate conduit communicatively connected with the open end of said receive, and a screw conveyor confined and operable in said conduit and operatively connected at the intake end of said conduit with the adjacent end of said rigid screw conveyor.

In addition to providing the turntable which serves as a support for the hopper and power plant, novelty is predicated on the conduit means by reason of the fact that the conduit, made up of separable hose sections, and the screw conveyor therein are both flexible, whereby they may, as an entity, be flexed in any suitable manner required and aimed or directed to convey the concrete from the hopper to the intended place of deposit regardless of the lay of the land over which the conduit is laid, stretched or otherwise supported.

Then, too, novelty is predicated on a flexible conveyor which is characterized by a conduit comprising reinforced rubber hose sections having means whereby adjacent cooperating ends of the sections are coupled together, a flexible screw conveyor section mounted for rotation in each hose section and comprising a flexible shaft made up of a plurality of rigid links hinged together in chain-like fashion, a rubber sleeve encasing said links, helically twisted conveyor flights integral with and radiating from winding around said sleeve and having outer marginal edges in wiping contact with the inner wall portions of said hose section, and means whereby the end-links may be mechanically joined to cooperating end-links of the intended complemental hose sections.

Other objects, features and advantages will become more readily apparent from the following description and the accompanying sheets of illustrative drawings.

In the drawings, wherein like numerals are employed to designate like parts throughout the views:

Figure 1 is a rear end elevation of a mobile conventional type concrete mixing machine equipped with the improved hopper and flexible conveyor and showing the manner in which the same may be used.

Figure 2 is a fragmentary view with parts in elevation and section showing the essential parts and the manner in which they are constructed and organized to carry out the objective set forth above.

Figure 3 is a top plan view of the structure seen in Figure 2.

Figure 4 is an enlarged fragmentary sectional and elevational view of a portion of one of the sections of the sectional flexible conveyor.

Figure 5 is a cross-section on the line 5—5 of Figure 4 looking in the direction of the arrows.

Referring now to Figure 1, the numeral 6 designates, generally construed, the aforementioned conventional mobile or equivalent concrete mixing machine. The bed or platform, which is wheel-supported, is denoted by the numeral 8. The customary, mechanically driven, rotatable mixing drum is denoted at 10 and the discharge spout or equivalent trough is denoted at 12. In carrying out the invention, the rear end of the platform is made to accommodate the extra facilities herein revealed. As evidenced from Figure 2, the base structure which is here utilized is denoted by the numeral 14 and this embodies a base plate 16 and an elevated mount 18 which is formed with marginal flange means and provided with a flat disk or plate 20. This in turn is provided with an upstanding channel-like endless or annular track 22 having ball race means 24 confined therein to support the outer marginal flange or edge portion of a circular turntable 26. The turntable is centrally apertured to provide an appropriate hub which is mounted on the spindle 28 carried by the mount 20. Outwardly of the track the plate 20 is provided with circumferentially spaced keeper holes 30 to accommodate a pivoted detent 32 on one end of a spring-biased latch 34. This is pivotally mounted as at 36 and operates in an obvious manner. Supported by legs or the like atop the turntable and fixed thereto is a suitable hollow receiver 38 in which a rigid screw conveyor section or component 40 is mounted for rotation. Removably mounted atop the receiver and in alignment therewith is a truncated conical hopper 42. In practice this is located beneath the spout so that the concrete is emptied therein and conveyed off in an obvious manner. The numeral 44 denotes what is here designated as a prime mover. This is any suitable power plant in actual practice and is here illustrated as a gasoline engine. The details thereof need not be, it is believed, described. The engine shaft drives the propeller 40 and an appropriate clutch lever or handle 46 is provided to throw the engine in and out of operation and may also be used to swing the turntable, hopper and engine assembly, as a unit, on the base structure. On one side the receiver is provided with an appropriate discharge neck 48 to accommodate the flexible conveyor. The conveyor in the instant situation is pliant and adaptable so that it may serve on irregular terrain, and especially on and in connection with hilly surfaces. As disclosed, the conveyor is made up of what may be called a flexible conduit and the latter, in turn, is composed of a plurality of separable sections 50. Each section is the same in construction and the description of one will suffice for all. To this end, each section comprises a suitable rubber or equivalent hose 52 which is reinforced with wire or the like as denoted at 54 in Figure 4. Appropriate couplings or collars 56 are provided at the ends and these are in turn provided with connecting pins 58 cooperable with bayonet slots in a manner not detailed. Any appropriate means may be employed for coupling the hose sections to each other. The conveyor on the interior of each section is a screw-type conveyor and comprises an axial flexible shaft. This is made up of a plurality of rigid links 60 hingedly connected together at 62. The connections are preferably appropriate universal joints. The shaft is encased with a rubber sleeve 64 and this in turn is provided with helical conveyor flights 66 which wind or advance around the sleeve, being radial to the axis of the sleeve and having their outer marginal edges in wiping and seating contact with the interior of each hose section.

If desired, tripodal stands such as shown at 68 in Figure 1 may be used. In any event, the concrete is deposited in the hopper and is fed through the flexible conveyor and the conveyor is arranged so as to conduct the ready-to-use concrete from the source of supply, the machine 6, to the place of deposit (not shown).

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in delivering already mixed ready-to-use concrete from a source of supply to a place of deposit and use, in combination, a base structure adapted to be fixedly mounted atop a mobile platform and embodying a mount having a flat plate portion marginally provided with circumferentially spaced keeper holes, an endless channel-like track fixed atop said plate portion, said track having ball-race means confined therein, said mount having a central fixed spindle, a turntable swivelly mounted on said spindle and having a marginal edge portion confined in said track and rotatable on said ball race means, a spring-biased latch carried by said turntable, a concrete receiver fixed operatively atop said turntable, a hopper mounted on and serving to funnel concrete into said receiver, a rigid screw conveyor mounted for operation in said receiver, the latter being closed at one end and open at the other end, a prime mover mounted on said turntable for movement simultaneously therewith and having operating connection with said screw conveyor, an elongated conduit communicatively connected with the open end of said receiver, and a screw conveyor confined and operable in said conduit and operatively connected at the intake end of said conduit with the adjacent end of said rigid screw conveyor, said conduit and the screw conveyor therein both being flexible, whereby they may, as an entity, be flexed in any suitable and required manner and thus aimed and directed to convey the mixed concrete from said hopper to the intended place of deposit regardless of the lay of the land over which the conduit is stretched and supported for use.

2. For use in delivering already mixed read-to-use concrete from a source of supply to a place of deposit and use, in combination, a base structure comprising a mount having a flat plate portion marginally provided with circumferentially spaced keeper holes, an endless channel-like track fixed atop said plate portion, said track having ball-race means confined therein, said mount having a central fixed spindle, a discoidal turntable swivelly mounted on said spindle and having a marginal edge portion confined in said track and rotatable on said ball race means, a spring-biased latch carried by said turntable and having a pivoted detent selectively engageable with said keeper holes, a receiver fixed atop said turntable, a hopper mounted on and serving to funnel concrete into said receiver, a rigid screw conveyor mounted for operation in said receiver, the latter being closed at one end and open at the other end, a prime mover mounted on said turntable for movement simultaneously therewith and having operating connection with said screw conveyor, an elongated conduit communicatively connected with the open end of said receiver, said conduit comprising reinforced flexible rubber hose sections having means whereby adjacent cooperating ends of the sections are coupled together, a flexible screw conveyor section mounted for rotation in each hose section and comprising a flexible shaft made up of a plurality of rigid links hinged together in chain-like fashion, a rubber sleeve encasing said links, helically twisted conveyor flights integral with and radiating from and winding around and integral with said sleeve and having outer marginal edges in wiping contact with the inner wall portions of said hose section, and means whereby the end-links may be mechanically joined to cooperating end-links of the intended complemental hose sections.

3. For use in delivering already mixed ready-to-use concrete from a source of supply to a place of deposit and use, in combination, a horizontally located turntable adapted to be mounted for hand-regulated rotation and adjustment on a mobile platform in close cooperating proximity to a source of concrete, a concrete receiver fixed atop and operable in conjunction with said turntable, a hopper operatively mounted on said receiver and serving to funnel concrete into said receiver, a rigid screw conveyor mounted for operation in said receiver, a prime mover mounted on said turntable for movement simultaneously therewith and having operating connection with said screw conveyor, an elongated conduit communicatively connected with said receiver, and a screw conveyor confined and operable in said conduit and operatively connected at the intake end of said conduit with the adjacent end of said rigid screw conveyor, said conduit and the screw conveyor therein both being flexible, whereby they may, as an entity, be flexed in any suitable and required manner and thus aimed and directed to convey the concrete from said hopper to the intended place of deposit regardless of the lay of the land over which the conduit is stretched and supported for use, said conduit comprising separably coupled end-to-end sections, each section having its own screw conveyor complement confined for rotation therein, a rigid base structure supporting said turntable and having keeper holes at circumferentially spaced places, and a spring-biased hand-operated retainer latch operatively mounted on said turntable and having a detent selectively engageable with a selected one of said keeper holes.

References Cited in the file of this patent

UNITED STATES PATENTS

| | | |
|---|---|---|
| 1,351,725 | Mosby | Aug. 31, 1920 |
| 1,398,649 | Richards | Nov. 29, 1921 |
| 1,446,124 | Lichtenberg | Feb. 20, 1923 |
| 2,006,357 | Kraeft | July 2, 1935 |
| 2,045,757 | Constantin | June 30, 1936 |
| 2,397,305 | Wheat | Mar. 26, 1946 |
| 2,606,645 | Heine | Aug. 12, 1952 |
| 2,630,906 | Phillip | Mar. 10, 1953 |

FOREIGN PATENTS

| | | |
|---|---|---|
| 14,794 | Great Britain | June 27, 1907 |